3,173,914
5,6-DIFLUORO STEROIDS AND PROCESS FOR THE PREPARATION THEREOF
Albert Bowers, Mexico City, Mexico, assignor, by mesne assignments, to Syntex Corporation, a corporation of Panama
No Drawing. Filed June 8, 1959, Ser. No. 818,505
20 Claims. (Cl. 260—239.55)

The present invention relates to a novel method for the production of fluorinated organic compounds and to certain novel compounds so prepared. More particularly, the present invention relates to a novel process for the production of fluorinated aliphatic, cyclic, and cyclic aliphatic organic compounds.

The production of monofluoro alkanes by treatment of hydrocarbon olefins with hydrofluoric acid is a well known process; the reaction is usually carried out without a catalyst and at wide temperature ranges. Ethyl fluoride in good yields may be prepared in this way. With longer, branched chain, or cyclic olefins, however, this reaction is complicated by the fact that monofluoro alkanes, especially secondary and tertiary fluorides, are difficult to purify, and that small amounts of water or acids, particularly hydrofluoric acid will initiate decomposition and isomerization. An alternative method of introducing fluorine into olefinic hydrocarbons, especially of olefinic cyclopentanophenanthrene derivatives having double bond between carbon C–5 and C–6 of the nucleus forming useful 6-fluoro cyclopentanophenanthrene derivatives has been described for example in U.S. Patents Nos. 2,838,492 to 2,838,502 and others. This method involves formation of the corresponding 5,6-oxido derivatives, separation of the 5α,6α-epoxides from the 5β,6β-isomer, and finally opening of the 5α,6α-oxido derivative with hydrofluoric acid. It will be apparent that the present method, which is also suitable for introducing fluorine atom at carbon C–6 of cyclopentanophenanthrene derivatives involves only one step, as compared to three steps of the above cited patents, and can be hence generally achieved at higher yields and lower cost.

In accordance with the present invention, the surprising discovery has been made that hydrofluoric acid, in the presence of a positive halogen ion (halogen or halo wherever herein used means other than fluorine or fluoro), will react with hydrocarbon olefins to produce stable fluoro-halo derivatives. It has been further discovered, in accordance with the present invention, that catalytic dehalogenation of fluoro-halo compounds will give fluorinated alkanes in high yields.

There has been further provided therefore a novel process, involving novel intermediates, for the production of fluorinated compounds heretofore not accessible.

In practicing the novel process olefinic hydrocarbons are treated with hydrofluoric acid in the presence of amides or imides, N-halogenated with chlorine, bromine or iodine acting as a source of positive halogen ion; the reaction may be further carried out, to obtain higher yields in presence of a proton acceptor; suitable proton acceptors are organic bases capable of accepting protons, which do not form insoluble complexes, or react with either of the reactants; such proton acceptors are preferably selected from the class consisting of hydrocarbon ethers or ketones.

The reaction of the present invention may be exemplified generally by the following equation:

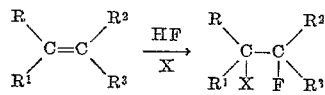

In the above equation X represents a halogen atom of atomic weight from 35 to 130 i.e. chlorine, bromine or iodine and R, R¹, R² and R³ stand for hydrogen or separately or together a hydrocarbon of less than 20 carbon atoms, straight or branched chain aliphatic, cyclic or cyclic aliphatic, or an aryl group of less than 11 carbon atoms; the ethylenic double bond may be further a part of a cyclic or cyclic-aliphatic hydrocarbon of less than 40 carbon atoms. Typical examples of compounds represented by the above equation are olefins such as ethylene, 1-butene, 2-pentene, 3-methyl-1-butene, 3,3-dimethyl-1-butene, 1-undecene, cyclobutene, cyclohexene, 1-n-propyl-cyclohex-1-ene, further members of the monoterpene, sesquiterpene, diterpene or triterpene compounds, such as limonene, menthene, α-santalene, abietic acid, lupeol and lanosterol and cyclopentanophenanthrene derivatives such as cholesterol, Δ⁵-androsten-3β,17β-diol, Δ⁵-pregnen-3β-ol-20-one, dianhydrostrophantidin, episterin, fucosterin, β-sitosterol, diosgenin and correllogenin.

Typical compounds within the above definitions which are especially suitable for the novel reaction to give highly useful products are those which may be illustrated by the following formulas:

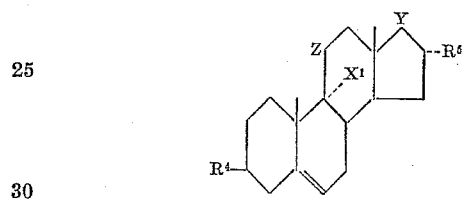

and

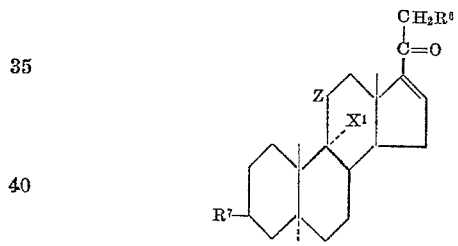

and

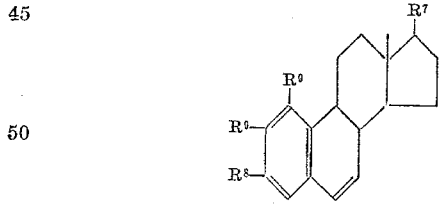

In the above formula Z stands for H₂, a keto group, 11β or 11α-hydroxyl; X¹ represents a hydrogen or a halogen atom of an atomic weight between 19 and 80 i.e. fluorine, chlorine or bromine; Y represents a keto or β-hydroxyl group, which may be further substituted in the α-position with a saturated hydrocarbon of less than six carbon atoms, such as methyl or ethyl or a pregnan side chain, characteristic for example of progesterone, 17α-hydroxy progesterone or cortisone; R⁴ represents a hydroxyl or ethylenedioxy group; R⁵ represents a hydrogen, a hydroxyl group or a methyl group; R⁶ represents a hydroxyl or hydrogen; R⁷ a hydroxyl or a ketone; R⁸ a hydroxyl or an alkoxy group such as methoxy or ethoxy and R⁹ may be a hydrogen or a methyl group; the alcoholic groups in compounds as above set forth may be further in the form of esters formed with hydrocarbon carboxylic acids of less than 12 carbon atoms, either straight or branched chain aliphatic, cyclic, or cyclic aliphatic; typical examples of such esters are the acetate, propionate, butyrate, benzoate, cyclopentylpropionate or trimethylacetate.

The novel process therefor leads to the production of novel intermediates of the following formula:

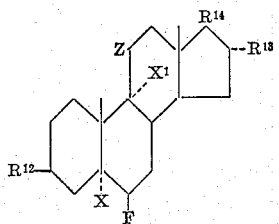

In the above formula X, Z and $X^1$ represent the same groups as heretofore, $R^{12}$ represents hydroxyl, keto or ethylenedioxy, $R^{13}$ represents hydrogen, hydroxyl or methyl and $R^{14}$ represents =O

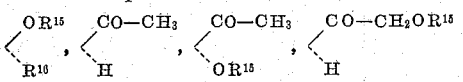

or

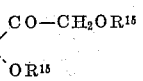

and $R^{15}$ represents hydrogen or a hydrocarbon carboxylic acyl group of up to 12 carbon atoms as conventional in steroids such as acetate, propionate, cyclopentylpropionate or benzoate, and $R^{16}$ represents hydrogen, lower alkyl, lower alkenyl or lower alkinyl.

It will be also apparent, that the novel process may be practiced upon the corresponding 19-nor compounds of the above formulas, i.e. those lacking the angular methyl group attached to carbon C–10.

Typical compounds within the above definitions which may be subjected to the novel reaction are $\Delta^5$-androsten-3β-ol-17-one, the diacetate of 17α-methyl-$\Delta^5$-androsten-3β,17β-diol, 3-ethylenedioxy-17α-methyl-9α-fluoro-$\Delta^5$-androsten-17β-ol-11-one, $\Delta^5$-pregnen-3β-ol-20-one, the 17-acetate of $\Delta^5$-pregnen-3β,17α-diol-20-one, 3-ethylenedioxy-$\Delta^5$-pregnen-17α-ol-20-one, 9α-chloro-$\Delta^5$-pregnen-3β,17α-diol-11,20-dione, 3-ethylenedioxy-$\Delta^5$-pregnen-17α,21-diol-11,20-dione, 16,21-diacetate of 9α-fluoro-3-ethylenedioxy-$\Delta^5$-pregnen-11β,16α,17α,21-tetrol-20-one, $\Delta^{16}$-pregnen-3β-ol-20-one, the acetate of $\Delta^{16}$-allo-pregnen-3β-ol-11,20-dione and the 3,21-diacetate of $\Delta^{16}$-pregnen-3β,21-diol-20-one, $\Delta^6$-dehydro estrone, the methyl ether of $\Delta^6$-dehydro estrone, the acetate of $\Delta^6$-dehydro estradiol, 1-methyl estrone and 1,2,17-trimethyl $\Delta^6$-dehydro estradiol.

The novel reaction, as hereinafter described, is further effective upon the double bonds of the perhydrophenanthrene molecule, as above set forth, which are between carbon C–1 and C–2, C–2 and C–3, C–3 and C–4, C–4 and C–5, C–5 and C–10, C–7 and C–8, C–9 and C–11, C–8 and C–9, C–8 and C–14, C–11 and C–12, C–13 and C–14, C–13 and C–17, C–14 and C–15, C–17 and C–20 and C–20 and C–21, as well as upon conjugated double bonds; typical examples of compounds within the above definition are $\Delta^{5(10)}$-androsten-17β-ol-3-one, $\Delta^{9(11)}$-pregnen-3β-ol-20-one, the 21-acetate of 3-ethylenedioxy-$\Delta^{4,9(11)}$-pregnadien-17α,21-diol-20-one, the 21-acetate of $\Delta^{1,4}$-pregnadien-17α,21-diol-3,11,20-trione, $\Delta^{4,14}$-pregnadien-17α-ol-3,20-dione, the 17,21-diacetate of $\Delta^{4,7}$-pregnadien-17α,21-diol-3,20-dione, and the 3,17-diacetate of $\Delta^{3,5}$-pregnadien-3,17α-diol-20-one. The novel process is further applicable to olefinic hydrocarbons, having in the rest of the molecule groups which are susceptible to the attack of hydrofluoric acid under the normal conditions of addition to an olefinic double bond, that is in absence of a positive halogen ion as above defined. Such groups may include for example β,γ-unsaturated ketones, which are known to rearrange to α,β-unsaturated ketones with strong acids, epoxide groups, which are known to give the corresponding fluorohydrins by action of hydrofluoric acid, or esters which are known to hydrolyze to the free alcohols with mineral acids. Thus for example treatment of 21-acetate of $\Delta^{5,9(11)}$-pregnadien-3β,17α,21-triol-20-one with hydrofluoric acid and N-halo amide or imide under the conditions as below described in detail, followed by isolation gives 21-acetate of $\Delta^{9(11)}$-5α-halo-6β-fluoro-pregnen-3β,17α,21-triol-20-one. Oxidation of this compound in a known manner, as for example with chromic acid in acetone and treatment of the ketone with for example dry hydrogen chloride in acetic acid gives 21-acetate of 6α-fluoro-$\Delta^{4,9(11)}$-pregnadien-17α,21-diol-3,20-dione, a compound which in turn may be converted in a known manner by treatment with for example hypobromous acid, sodium acetate and hydrogen fluoride, to the corresponding 6α,9α-difluoro-cortisone, cortical hormone of known therapeutic efficacy.

The novel process therefore is especially suitable for the preparation of novel 5α-halo-6β-fluoro steroids of androstane and pregnan series, which are useful intermediates for the production of 6-fluoro androstan and pregnan derivatives of known therapeutic use, as disclosed for example in U.S. Patents Nos. 2,838,492 to 2,838,502, as well as others; the novel process is likewise suitable for the production of 6β-fluoro-7α-halo compounds which are useful intermediates (by elimination of the 7α-halo group as herein described) for preparation of corresponding 6-fluoro-$\Delta^6$-dehydro androstan and pregnan derivatives. These $\Delta^6$ compounds of the androstane series have an enhanced anabolic-androgenic ratio, of the 21-desoxy pregnane type are progestational and of the 21-hydroxy type are anti-inflammatory and cortical. The novel 1α-halo-2β-fluoro-, 8α-halo-9β-fluoro-, 9α-halo-11β-fluoro-, 10β-halo-5α-fluoro-, 11β-fluoro-12α-halo, 17β-fluoro-20-halo, 16β-fluoro-17α-halo, and 7α-halo-8β-fluoro cyclopentanophenanthrene derivatives specifically described hereinafter are useful intermediates for the production of the corresponding novel and therapeutically useful compounds, 2-fluoro-$\Delta^1$-dehydro-, 8β-fluoro-, 9β-fluoro-, 11β-fluoro-, 16β-fluoro-, and 7β-fluoro cyclopentanophenanthrene derivatives by elimination of the halo group as herein described. These novel compounds exhibit androgenic, anti-androgenic, catabolic, eosinophilic, anti-inflammatory, progestational and myotropic activity and are also active in suppressing the activity of the pituitary gland. The novel 5α-halo-4β-fluoro androstan and pregnen derivatives are useful intermediates for the production of known therapeutically useful 4-fluoro-$\Delta^4$-androsten and pregnen compounds.

The known 6-fluoro-$\Delta^4$-3-keto steroid derivatives and novel intermediates of the androsten and pregnen series may be prepared from $\Delta^6$-compounds in accordance with the present invention as exemplified in the equation below:

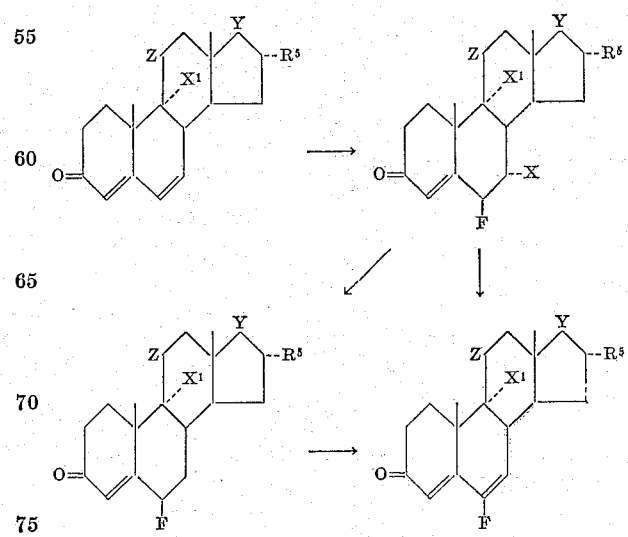

In the above formula $R^5$, X, $X^1$, Z and Y represent the same groups as above set forth.

In practicing the novel process as above shown, treatment of $\Delta^{4,6}$-3-keto steroids of androstadien and pregnadien series with hydrofluoric acid and N-halogenated hydrocarbon amide or imidie, preferably in presence of hydrocarbon ether or ketone, gives 6β-fluoro-7α-halo (bromo, chloro or iodo) $\Delta^4$-3-keto steroid compounds; these compounds may be treated with a reducing agent as for example with hydrogen in presence of suitable catalyst, or with magnesium-iodide mixture and then with water, to effect the replacement of the 7α-halogen for hydrogen. The 6β-fluoro compounds thus obtained may be further treated in known manner with agents capable to effect isomerization, such as for example with hydrogen chloride in acetic acid to give the corresponding 6α-fluoro derivatives, useful therapeutic agents of known pharmacological potency.

The novel process therefore leads to the production of novel intermediates of the following formula:

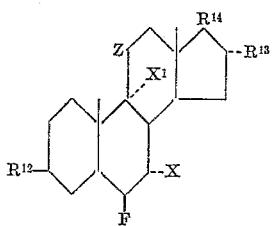

In the above formula X, Z and $X^1$ represent the same groups as heretofore, $R^{12}$ represents hydroxyl, keto or ethylenedioxy, $R^{13}$ represents hydrogen, hydroxyl or methyl and $R^{14}$ represents =O,

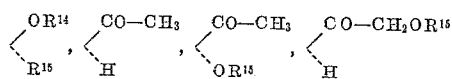

or

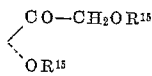

and $R^{15}$ represents hydrogen or a hydrocarbon carboxylic acyl group of up to 12 carbon atoms as conventional in steroids such as acetate, propionate, cyclopentylpropionate or benzoate, and $R^1$ represents hydrogen, lower alkyl, lower alkenyl or lower alkinyl.

Alternatively, it has been discovered in accordance with the present invention, that treatment of the 6β-fluoro-7α-halo steroids with lithium chloride or calcium carbonate in dimethyl formamide at elevated temperatures, preferably around the boiling point of the solvent used, eliminates preferentially the 7α-halo atom and there are obtained 6-fluoro-$\Delta^6$-dehydro steroids, which are likewise known useful therapeutic agents.

Typical useful compounds within the above definition are for example 6α-fluoro-testosterone, 6α-fluoro-progesterone, acetate of 6α-fluoro-17α-hydroxy progesterone, acetate of 6α-fluoro cortisone, 6α,9α-difluoro hydrocortisone, 16α-hydroxy-6α,9α-difluoro cortisone and hydrocortisone and 16α-methyl-6α,9α-difluoro cortisone and hydrocortisone, acetate of 6-fluoro-$\Delta^6$-dehydro-17α-hydroxy progesterone 6-fluoro-$\Delta^6$-dehydro-17α-hydroxy progesterone, 6-fluoro-$\Delta^6$-dehydro cortisone and 6,9α-difluoro-16α-hydroxy and 16α-methyl-cortisone.

To carry out the novel reaction there are used as a source of positive halogen ion, N-halogenated hydrocarbon amides or imides obtained in a known manner by treating, with hypohalous acids or elemental halogen, amides or imides derived from hydrocarbon mono- or dicarboxylic acids of less than 20 carbon atoms.

The N-halogenated amides or imides within the above definition may be illustrated by the following formulas:

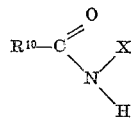

and

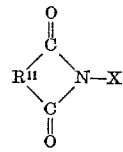

and

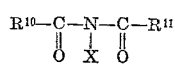

In the above formula X represents halogen having atomic weight between 35 and 130 and $R^{10}$ and $R^{11}$ represent a saturated or unsaturated hydrocarbon of less than 20 carbon atoms, straight or branched chain aliphatic, cyclic, or cyclic aliphatic; typical examples of such amide or imide are acetamide, propionamide, n-butyramide, isobutyramide, palmitamide, succinimide, phthalimide, benzamide and p-toluenamide, N-halogenated by chlorine, bromine or iodine.

The proton acceptor, as above set forth, is preferably selected from hydrocarbon ethers or ketones. The ethers may be derived from saturated or unsaturated hydrocarbons either straight or branched chain aliphatic, cyclic, or cyclic aliphatic of less than 9 carbon atoms, such as for example dioxane, furane, tetrahydrofurane, diethyl ether, methyl n-butyl ether, di-n-butyl ether, diisoamyl ether, di-n-hexyl ether, ethylene glycol dimethyl ether and diphenyl ether. The ketones may be derived from saturated or unsaturated hydrocarbons either straight or branched chain aliphatic, cyclic or cyclic aliphatic of less than 16 carbon atoms, such as for example methyl ethyl ketone, acetone, diethylketone, diisopropylketone, acetyl acetone, cyclo-hexanone, benzophenone, and also diketones such as quinone, anthraquinone and 1,4-naphtoquinone.

In practicing the process of the present invention, hydrofluoric acid, 1 to 100 mols, but preferably about 30 mols, and preferably in form of anhydrous hydrofluoric acid, is optionally mixed with an hydrocarbon ether or ketone as above defined, either added alone or dissolved in an inert organic solvent. There is used between 0.1 to 2 mols of the ether or ketone, but preferably there is used approximately 0.5 mol per one mole of the hydrofluoric acid used. The mixture is then cooled to below 0° C., preferably between —15 to —80° C. and to the cooled mixture is added approximately 1.0 mol of the compound to be fluorinated, preferably dissolved in an inert organic solvent. Suitable solvents may be selected from saturated liquid hydrocarbons, cyclic, aliphatic or cyclic aliphatic, such as hexane, octane or cyclohexane, further aromatic hydrocarbons, such as benzene or toluene or preferably halogenated hydrocarbons such as for example chloroform, or methylene chloride. Finally, to this mixture is added between 0.5 to 1.5 molar equivalents, but preferably approximately one molar equivalent of N-halogenated amide or imide. The reaction mixture is then allowed to react at temperatures below 0° C. for approximately between 15 minutes to 3 hours and the fluorinated-halogenated product is isolated in a conventional manner. It has been found that the reaction may be also carried at temperatures higher than 0° C.; in this case, the reaction is carried out preferably under pressure.

The isolated halogenated-fluorinated product is then dissolved in an organic solvent, such as for example lower aliphatic alcohol, ester of lower aliphatic alcohol with lower aliphatic acid, further lower aliphatic hydrocarbon and lower aliphatic carboxylic acid. Typical examples of such solvents are methyl alcohol, ethyl alcohol and propyl alcohol, ethyl acetate, amyl acetate and butyl propionate, hexane and octane, further formic, acetic and propionic acid. To this solution is then added a catalyst, between 0.1 to 5 times the weight of the halogenated-fluorinated product, commonly used in hydrogenation processes; such catalyst is selected preferably from the metals forming the eighth group in the periodic table, such as for example nickel, palladium, ruthenium and platinum; the catalyst may be employed either in the metallic form or in form of its oxides, deposited perhaps on a suitable carrier, such as carbon, calcium carbonate or barium sulphate. The reaction mixture is then maintained at between 0° to 45° C., but preferably at around 25° C., while stirring, and under an atmosphere of hydrogen, for approximately between 0.5 to 8 hours till the exchange of hydrogen for halogen is complete.

It has been further discovered in accordance with the present process, that the dehalogenation above described, can be carried out using a reducing agent, preferably chromous chloride. In practicing the process as above set forth, the halogenated-fluorinated product is dissolved in a water miscible solvent, such as a lower aliphatic carboxylic acid, or lower aliphatic ketone as for example acetic acid or acetone, and an aqueous solution of chromous chloride, preferably about 1.5 mols, is added. The solution is stirred at about 25° for approximately ½ hour, when the exchange of halogen for hydrogen is completed, and the fluorinated product is then isolated.

In cases where, in the halo-fluoro compounds, the halogen stands in β-position to a functionally derived, or protected keto group, such as for example an alcohol or a ketonic derivative such as ketal, the ketonic function is first regenerated in the known manner, as for example by oxidation with chromic acid, or by treatment with an inorganic acid. The β-halogen is then eliminated by treatment with mineral acids in suitable organic solvent (cf. Barton et al., J.A.C.S., 1066 (1950)). Such methods involve for example treatment of the halofluoro ketone with hydrochloric acid, or with alkali metal salts of lower aliphatic carboxylic acids, preferably sodium acetate; suitable solvents for such reaction are lower aliphatic carboxylic acids, lower aliphatic alcohols, ketones ,or halogenated hydrocarbons; typical examples of such solvents are acetic and propionic acid, methyl, ethyl and butyl alcohol, acetone and methyl propyl ketone, chloroform and methylene-chloride.

It has been further discovered in accordance with the present invention, that reacting the fluoro-halo (bromo for example) compounds as above set forth with magnesium metal, preferably in finely divided form and in presence of iodine, there is formed the corresponding magnesium halide (bromide for example) compound, which, upon addition of water is converted into the corresponding fluoro derivative.

This process if preferably carried out in an inert anhydrous organic solvent selected from hydrocarbon ethers as above set forth, such as for example diethyl ether, dioxane and tetrahydrofurane.

In practicing the process of halogen elimination as above set forth, the corresponding halo-fluoro compound is dissolved for example in dry ether; finely divided magnesium, about 0.8 to 3 mols, but preferably about 1.5 moles and iodine, about 0.005 to 0.5 mole, but preferably about 0.1 mole, are treated for about 5 minutes to about 150°. This mixture is then cooled under anhydrous conditions and is added to the ethereal solution of the halo-fluoro compound. This mixture is stirred first at room temperature for between 2 to 15 minutes and may be further stirred for additional 5 to about 15 minutes, while heating to refluxing if the formation of the magnesium halide should be incomplete. The mixture is then cooled to room temperature, water is added, and the solution is again stirred for about 10 to 15 minutes.

Additional water may then be added to facilitate the separation of the organic layer and the fluorinated compound may then be isolated and purified in a conventional manner, as for example by crystallization.

The novel process of the present invention as described is suitable for the preparation of monofluorinated compounds by addition of the fluorine atom to a single olefinic double bond; it is clear, however, that if it is desired to introduce several fluorine atoms into compounds having two or more olefinic double bonds, there has to be used two or several times more of the principal reactants, such as hydrofluoric acid and the halogenated amide or imide, depending on the number of fluorine atoms to be introduced and upon the number of the double bonds present in the molecule.

The following specific examples serve to illustrate but are not intended to limit the present invention. The degrees are indictaed in centigrade degrees.

EXAMPLE I

To a mixture of 5 g. of hydrofluoric acid and 8.8 g. of tetrahydofurane, cooled to −80° C. was added a cold solution of 1 g. of cyclohexene, dissolved in 50 cc. of methylene dichloride, and 1.05 molar equivalents of N-bromo-acetamide added in portions, while stirring. The reaction mixture was maintained at −80° C. for 1 hour and then at 0° C. for an additional hour; it was then poured into cold water, containing sufficient sodium carbonate to neutralize the excess of hydrofluoric acid, the organic layer was separated, washed with water, dried over sodium sulfate and the solvent was evaporated in vacuo maintaining the bath temperature at 50–55° C.; the distillation residue consisted of 1-bromo-2-fluoro cyclohexane.

To the above compound, dissolved in 50 cc. of acetone, there was added 2 g. of Raney nickel and the suspension was stirred at room temperature for 2½ hours; the catalyst was then removed by filtration under nitrogen atmosphere and the resulting monofluoro-cyclohexane was purified by distillation under reduced pressure.

EXAMPLE II

By the same method as described in Example I, but substituting tetrahydrofurane by dioxane and N-bromo-acetimide by N-iodo succinimide, there was obtained monofluorocyclohexane in essentially the same yields.

EXAMPLE III 2 g. of 1-bromo-2-fluoro cyclohexane, obtained in accordance with Example I, was dissolved in 40 cc. of ethyl acetate, 350 mg. of palladium on charcoal (5%) was added, and the mixture was hydrogenated at atmospheric pressure and room temperature till the uptake of 1 mol of hydrogen was completed, which took approximately 3½ hours. The catalyst was then removed by filtration and the solvent was removed by distillation under reduced pressure. The resulting monofluorocyclohexane was identical with the compound prepared in accordance with Example I.

EXAMPLE IV 2 g. of cyclohexen, 50 cc. of chloroform and 12 g. of hydrofluoric acid were mixed, cooled to −65° and divided into eight portions. To each portion was then added 0.5 mols of a proton acceptor and 1.1 mols of the N-halogenated amide or imide, as indicated. The intermediate compounds formed were isolated as indicated in Table I.

*Table I*

| Proton acceptor | Source of positive halogen | Compounds formed |
|---|---|---|
| Diethylether | N-bromophtalimide | 1-bromo-2-fluoro-cyclohexane. |
| Di-n-hexyl ether | N-chlorophtalimide | 1-chloro-2-fluoro-cyclohexane. |
| Methyl n-butyl ether | N-chloropalmitamide | 1-chloro-2-fluoro-cyclohexane. |
| Diisoamylether | N-bromoundecenoyl-amide. | 1-bromo-2-fluoro-cyclohexane. |
| Acetone | N-iodobenzamide | 1-iodo-2-fluoro-cyclohexane. |
| Cyclohexaneone | N-iodoisobutyramide | 1-iodo-2-fluoro-cyclohexane. |
| Benzophenone | N-chloropropionamide | 1-chloro-2-fluoro-cyclohexane. |
| Anthraquinone | N-chlorotolamide | 1-chloro-2-fluoro-cyclohexane. |

EXAMPLE V 2 g. of $\Delta^5$-androsten-3$\beta$,17$\beta$-diol and 50 cc. of solvent, as indicated in Table II, were mixed, divided into six portions, 1.1 mol of N-bromosuccinimide was added to each portion and the reaction was carried out in presence or absence of a proton acceptor and at temperatures as indicated. At the end of the reaction the product was isolated as described in Example I and the yields of 5$\alpha$-bromo-6$\beta$-fluoro-androstan-3$\beta$,17$\beta$-diol were compared as shown in Table II.

*Table II*

| Solvent | Proton acceptor | Temperature, degrees | Time (hrs.) | Yield, percent |
|---|---|---|---|---|
| Methylenechloride | Tetrahydrofurane | −70 | 1½ | 80 |
| Do | None | −70 | 1½ | 35 |
| Toluene | Tetrahydrofurane | −65 | 1½ | 78 |
| Do | do | 0 | 1 | 46 |
| Do | None | 0 | 1 | 25 |
| Do | None | +15 | ¼ | 15 |

EXAMPLE VI 1.5 g. of octene-1 was dissolved in 40 cc. of carbon tetrachloride, 10 g. of anhydrous hydrofluoric acid and 16 g. of tetrahydrofurane was added and the mixture was cooled to between −65° to −70° and was maintained at this temperature throughout the reaction. 1.1 molar equivalents of N-bromosuccinimide were added in portion and the reaction mixture was then maintained at the same temperature for about 1 hour. Following the same isolation procedure as described in Example I there was isolated 1-bromo-2-fluoro octane.

Catalytic hydrogenation of this compound with palladium on carbon as described in Example III gave, after purification by distillation, 2-fluoro octane.

Following the same method as described above there were prepared the halo-fluoro and finally fluoro compounds as outlined in Table III.

EXAMPLE VII 1 g. of cyclohexene, dissolved in 45 ml. of chloroform, was added to 4 g. of hydrofluoric acid, the mixture was cooled to −65°, and then there was added 1.1 molar equivalents of N-bromoacetamide in portions, while stirring. The reaction mixture was maintained at −65° C. for 1½ hours, then at 0° to +5° C. for an additional hour and was finally worked in the same manner as described in Example I. The yield of 1-bromo-2-fluoro-cyclohexane was only about 40% as compared to yields obtained in Example I.

EXAMPLE VIII

By the same method, as described in Example I, but substituting the 8.8 g. of tetrahydrofurane by 4.2 g. of fluorenone and cyclohexene by hexen 5-oic acid there was obtained 5-fluoro-6-bromo hexanoic acid. 1 g. of the above acid, dissolved in 50 ml. of methanol, and 200 mg. of palladium on carbon (5%) was maintained under hydrogen atmosphere, while stirring at room temperature until there was absorbed 1 molar equivalent of hydrogen; the catalyst was renewed by filtration, the solvent removed by distillation under reduced pressure; thus was obtained crude 5-fluoro hexanoic acid, which was purified by chromatography in silica gel.

EXAMPLE IX

By the same method as described in Example I, but substituting the N-bromoacetamide by N-bromosuccinimide, methylene chloride by octane, and cyclohexane by the methyl ester of hexen-5-oic acid, there was obtained finally the methyl ester of 5-fluoro-hexanoic acid.

EXAMPLE X

By the same method of described in Example I, by reacting 1 g. of $\Delta^5$-pregnen-3$\beta$-ol-20-one with hydrofluoric acid and N-bromoacetamide there was obtained 950 mg. of 5$\alpha$-bromo-6$\beta$-fluoro-pregnan-3$\beta$-ol-20-one. The above compound, dissolved in 50 cc. of acetone, was cooled to 0° and was then treated with 1.1 mol of 8N chromic acid (prepared from chromium trioxide and aqueous sulfuric acid) under nitrogen atmosphere while stirring, and maintaining the temperature at 0° C. The reaction mixture was stirred for additional 5 minutes at ±0° C., was diluted with water, the precipitate was collected by filtration, washed with water till neutrality and dried; thus was obtained crude 5$\alpha$-bromo-6$\beta$-fluoro-pregnan-3,20-dione.

The above compound, dissolved in 35 cc. of glacial acetic acid, was treated with dry hydrogen chloride gas for four hours maintaining the temperature at 15° C.; the solution was then poured into cold water, the precipitate was filtered, washed with water, dried and crystalized from acetone-hexane; the 6$\alpha$-fluoro progesterone, thus obtained, was identical with an authentic specimen.

*Table III*

| Starting Material | Intermediate compound | Final compound |
|---|---|---|
| Hexene-1 | 1-bromo-2-fluoro hexane | 2-fluoro-hexane. |
| 3-methyl-butene-1 | 1-bromo-2-fluoro-3-methyl butane | 2-fluoro-3-methyl-butane. |
| 2,3-dimethyl-2-butene | 2-bromo-3-fluoro-2,3-dimethyl-butane | 3-fluoro-2,3-dimethyl butane. |
| Citronellol | 2-fluoro-3-bromo citronellol | 2-fluoro-citronellol. |
| 2,6-dimethyl-oct-7-en-4-one | 2,6-dimethyl-oct-7-fluoro-8-bromo-4-one | 2,6-dimethyl-oct-7-fluoro-4-one. |
| $\alpha$-Pinene | fluoro-bromo-$\alpha$-pinane | $\alpha$-pinene-hydro-fluoride. |
| 16$\alpha$,17$\alpha$-epoxido $\Delta^{9,11}$-neosterol | 5$\alpha$-bromo-6$\beta$-fluoro-16$\alpha$,17$\alpha$-epoxido-$\Delta^{9,11}$-neosterol. | 6$\beta$-fluoro-16$\alpha$,17$\alpha$-$\Delta^{9,11}$-progesterone. |
| Lupeol | 28-fluoro-29-bromo dihydrolupeol | 28-fluoro-dihydrobetulin. |
| $\Delta^{2(3)}$-pregnen-20-one | 2$\beta$-fluoro-3$\alpha$-bromo-pregnan-20-one | 2$\beta$-fluoro-pregnan-20-one. |
| $\Delta^8$-cholestenol | 8$\alpha$-bromo-9$\beta$-fluoro-cholestanol | 9$\beta$-fluoro-cholestanol. |
| $\Delta^{8(14)}$-cholestenol | 8$\beta$-fluoro-14$\alpha$-bromo-cholestanol | 8$\beta$-fluoro-cholestanol. |
| $\Delta^{4,11}$-pregnadien-3,20-dione | 11$\beta$-fluoro-9$\alpha$-bromo-$\Delta^4$-pregnen-3,20-dione. | 11$\beta$-fluoro-$\Delta^4$-pregnen-3,20-dione. |
| 21-acetate of 6-fluoro-$\Delta^{4,17(20)}$-pregnadien-11$\beta$,21-diol-3-one. | 21-acetate of 20-bromo-17$\beta$-fluoro-$\Delta^4$-isopregnen-11$\beta$,21-diol. | |

EXAMPLE XI 0.5 g. of 5α-bromo-6β-fluoro-pregnan-3,20-dione was dissolved in 25 cc. of methanol; 1 g. of anhydrous sodium acetate was added and the mixture was refluxed for 3 hours; it was then cooled, water was added and the precipitate filtered, washed and dried.

Crystallization from ether gave 6β-fluoro progesterone, identical to an authentic specimen.

EXAMPLE XII

Treatment of 5α-bromo-6β-fluoro-pregnan-3β-ol-20-one, obtained as described in the above example, with Raney nickel or palladium on charcoal as described in Example III gave in almost the same yields 6β-fluoro-allopregnan-3β-ol-20-one.

EXAMPLE XIII

By the same method as described in Example I but using the hydrogenation method, in presence of 200 mg. of ammonium acetate per 1 g. of compound, as described in Example III and starting from the materials as indicated, there were obtained the following intermediates and final compounds.

| Starting Compound | Intermediate | Final Compound |
| --- | --- | --- |
| 21-acetate of $\Delta^{1,4}$-pregnadien-17α, 21-diol-3,11,20-trione. | 21-acetate of 1α-bromo-2β-fluoro-$\Delta^4$-pregnen-17α,21-diol-3,11,20-trione. | 21-acetate of 2β-fluoro-$\Delta^4$-pregnen-17α, 21-diol-3,11,20-trione. |
| $\Delta^{1,4}$-androstadien-17β-ol-3-one. | 1α-bromo-2β-fluoro-$\Delta^4$-androsten-17β-ol-3-one. | 2β-fluoro-$\Delta^4$-androsten-17β-ol-3-one. |
| 17α-methyl-$\Delta^{1,4}$-androstadien-17β-ol-3-one. | 1α-bromo-2β-fluoro-17α-methyl-$\Delta^4$-androsten-17β-ol-3-one. | 2β-fluoro-17α-methyl-$\Delta^4$-androsten-17β-ol-3-one. |
| 17α-ethyl-$\Delta^{1,4}$-androstadien-17β-ol-3-one. | 1α-bromo-2β-fluoro-17α-ethyl-$\Delta^4$-androsten-17β-ol-3-one. | 2β-fluoro-17α-ethyl-$\Delta^4$-androsten-17β-ol-3-one. |
| 17-acetate of 9α-fluoro-$\Delta^{1,4}$-pregnadien-11β, 17α-diol-3, 20-dione. | 17-acetate of 1β-bromo-2α, 9α-difluoro-$\Delta^4$-pregnen-11β, 17α-diol-3, 20-dione. | 17-acetate of 2β- 9α-di-fluoro-$\Delta^4$-pregnen-11β, 17α-diol-3, 20-dione. |
| 21-acetate of $\Delta^{4,14}$-pregnadien-17α, 21-diol-3, 20-dione. | 21-acetate of 14α-bromo-15β-fluoro-$\Delta^4$-pregnen-17α, 21-diol-3, 20-dione. | 21-acetate of 15β-fluoro-$\Delta^4$-pregnen-17α, 21-diol-3, 20-dione. |
| 16β-methyl-$\Delta^{5,10}$-nor-androsten-3β, 17β-diol. | 5α-bromo-6β-fluoro-16β-methyl-19-nor-androstan-3β, 17β-diol. | 6β-fluoro-16β-methyl-19-nor-androstan-3β-17β-diol. |
| 17,21-diacetate of $\Delta^{4,7}$-pregnadien-17α, 21-diol-3, 20-dione. | 17,21-diacetate of 7α-bromo-8β-fluoro-$\Delta^4$-pregnen-17α, 21-diol-3, 20-dione. | 17,21-diacetate of 8β-fluoro-$\Delta^4$-pregnen-17α, 21-diol-3, 20-dione. |
| $\Delta^7$-cholestenol. | 7α-bromo-8β-fluoro-cholestanol. | 8β-fluoro-cholestanol. |
| $\Delta^7$-3α, 12α-dihydroxy-cholenic acid. | 7α-bromo-8β-fluoro-3α, 12α-dihydroxy-cholanic acid. | 8β-fluoro-3α, 12α-dihydroxycholanic acid. |
| 21-trimethyl acetate of $\Delta^{4,9(11)}$-pregnadien-17α-21-diol-3, 20-dione. | 21-trimethyl-acetate of 9α-bromo-11β-fluoro-$\Delta^4$-pregnen-17α, 21-diol-3, 20-dione. | 21-trimethyl acetate of 11β-fluoro-$\Delta^4$-pregnen-17α, 21-diol-3, 20-dione. |
| The acetate of $\Delta^{16}$-allopregnen-3β-ol-11, 20-dione. | The acetate of 16β-fluoro-17α-bromo-allopregnan-3β-ol-11, 20-dione. | The acetate of 16β-fluoro-allopregnan-3β-ol-11, 20-dione. |
| $\Delta^{16}$-pregnen-3β-ol-20-one. | 16β-fluoro-17α-bromo-pregnan-3β-ol-20-one. | 16β-fluoro-pregnan-3β-ol-20-one. |
| $\Delta^{4,16}$-pregnadien-3, 20-dione. | 16β-fluoro-17α-bromo-$\Delta^4$-pregnen-3, 20-dione. | 16β-fluoro-$\Delta^4$-pregnen-3, 20-dione. |

EXAMPLE XIV 1.0 g. of 16β-fluoro-17α-bromoallopregnan-3β-ol-11,20-dione acetate produced in accordance with the method of Example I by treatment of $\Delta^{16}$-allopregnene-3β-ol-11,20-dione acetate with hydrofluoric acid and N-bromo-acetamide in methylene dichloride solution in the presence of tetrahydrofurane, was dissolved in 30 cc. of acetic acid. To this solution at 15–20° was added one drop of a 7 N hydrogen bromide solution in acetic acid and then a solution of 240 mg. of bromine in 5 cc. of acetic acid. After stirring at 20° for 2 hours, addition of water and filtration gave 16β-fluoro-17α,21-dibromoallopregnan-3β-ol-11,20-dione acetate which was purified by crystallization from methylene dichloride-hexane.

1.0 g. of the above compound, was dissolved in 35 cc. of absolute methanol containing 570 mg. sodium and the solution was kept at room temperature for 16 hours. After neutralizing with acetic acid the solution was evaporated to a small volume. It was then poured into water, the precipitate was collected by filtration and the resulting crude 16β-fluoro-21-carbomethoxy-$\Delta^{17(20)}$-pregnen-3β-ol-11-one was purified by chromatography over alumina.

The above compound was dissolved in 50 cc. of ether and the solution was added over 10 minutes to a stirred suspension of 250 mg. of lithium aluminum hydride in 50 cc. of ether. After a further 10 minutes at room temperature the excess of reagent was destroyed by the addition of ethyl acetate. A saturated solution of sodium sulfate (5 cc.) was then added followed by the addition of 25 g. of anhydrous sodium sulfate. Filtration and removal of the solvent under vacuum afforded 16β-fluoro-$\Delta^{17(20)}$-pregnen-3β,21-diol-11-one, purified by crystallization from acetone-hexane.

The above compound was dissolved in 15 cc. of pyridine containing 2 cc. of acetic anhydride and the mixture was kept at room temperature for 16 hours. Addition of ice water and filtration afforded 16β-fluoro-$\Delta^{17(20)}$-pregnen-3β,21-diol-11-one diacetate.

EXAMPLE XV 600 mg. of osmium tetroxide was added to a solution of 16β-fluoro-$\Delta^{17(20)}$-pregnen-3β,21-diol-11-one diacetate (1.0 g.), prepared as described in the preceding example, dissolved in 50 cc. of pyridine-chloroform (1:1) mixture and the solution was kept at room temperature for 5 days. At the end of the reaction period hydrogen sulphide was bubbled for 45 minutes through the solution, 200 cc. of ethyl acetate was added and the precipitate was removed by filtration.

The filtrate was evaporated to dryness in vacuo to afford 16β-fluoro allopregnan-3β,17α,20,21-tetrol-11-one-3, 21-diacetate.

To a solution of the above compound (1 g. in 50 cc. of acetone) was added 8 N chromic acid solution (1.05 equivalents) while maintaining the temperature at ±0°. The solution was kept at the same temperature while stirring for additional 5 minutes, water was added and the precipitate was removed by filtration. Crystallization from ethyl acetate hexane afforded 16β-fluoroallopregnan-3β,17α,21-triol-11,20-dione-3,21-diacetate.

EXAMPLE XVI 250 mg. of potassium hydroxide was added to a solution of 1 g. of 16β-fluoroallopregnan-3β,17α,21-triol-11,20-dione-3,21-diacetate in 100 cc. of methanol at 0° in an atmosphere of nitrogen. After stirring at 0° for 1 hour the solution was neutralized with acetic acid. Addition of water precipitated 16β-fluoroallopregnan-3β,17α, 21-triol-11,20-dione. Acetylation of this product by treating a solution in pyridine with 1.05 equivalents of acetic anhydride at 0° for 24 hours gave 16β-fluoro-allopregnan-3β,17α,21-triol-11,20-dione monoacetate.

EXAMPLE XVII

Oxidation of the product obtained in the preceding example with chromic acid in acetone according to the method described in Example XV led to 16β-fluoro-allopregnan-17α,21-diol-3,11,20-trione 21-acetate.

EXAMPLE XVIII 2 milli mols of bromine in 5 cc. of acetic acid was added to a solution of 16β-fluoroallopregnan-17α,21-diol- 3,11,20-trione (1 milli mol) in 30 cc. of acetic acid at 10° over 10 minute period. The uptake of the bromine was very rapid. After a further 5 minutes ice water was added and the precipitated 16β-fluoro-2,4-dibromoallopregnan - 17α,21 - diol-3,11,20-trione 21-acetate was removed by filtration. The crude dibromo compound was dried at room temperature in vacuo. It was then dissolved in dimethyl acetamide (20 cc.) and added over 10 minutes to a suspension of 500 mg. of calcium carbonate in boiling dimethyl acetamide (25 cc.). After heating under reflux for a further 15 minutes the calcium carbonate was removed by filtration. Addition of water and filtration gave 16β-fluoroprednisone acetate purified by chromatography over alumina and crystallization from acetone.

EXAMPLE XIX

By the same method as described in Example X there were prepared the intermediate and final compounds as indicated in Table IV.

EXAMPLE XXI 1 g. of the acetate of 6β-fluoro-7α-bromo-testosterone, obtained as described above, was dissolved in 50 cc. of methanol, ammonium acetate, 200 mg., and palladium on barium sulfate, 200 mg., were added and the mixture was stirred at room temperature and under hydrogen (570 mm. pressure) till there was an uptake of 1 mol of hydrogen and the exchange of bromine for hydrogen was complete. The catalyst was removed by filtration and the solvent was evaporated under reduced pressure. crystallization of the residue from acetone hexane gave the acetate of 6β-fluoro-testosterone, identical with the known compound.

EXAMPLE XXII

By the same methods as described in Example XIX and XX there were obtained, starting from the appropriate Δ⁶-dehydro derivatives the following intermediate and final compounds:

Table IV

| Starting Material | Intermediate Compound | Final Compound |
| --- | --- | --- |
| 17,21-diacetate of Δ⁵-pregnen-3β,17α,21-triol-20-one. | 17,21-diacetate of 5α-bromo-6β-fluoro-pregnan-3β,17α,21-triol-20-one. | 17,21-diacetate of 6α-fluoro-Δ⁴-pregnen-17α,21-diol-3,20-dione. |
| 17-acetate of Δ⁵-pregnen-3β,17α-diol-20-one. | 17-acetate of 5α-bromo-6β-fluoro-3β,17α-diol-20-one. | 17-acetate of 6α-fluoro-Δ⁴-pregnen-17α-ol-3,20-dione. |
| 17α-methyl-Δ⁵-androsten-3β,17β-diol. | 17α-methyl-5α-bromo-6β-fluoro-androstan-3β,17β-diol. | 17α-methyl-6α-fluoro-testosterone. |
| 17α-ethyl-19-nor-Δ⁵-androsten-3β,17β-diol. | 17α, ethyl-5α-bromo-6β-fluoro-19-nor-androstan-3β,17β-diol. | 6α-fluoro-17α-ethyl-19-nor-testosterone. |
| 21-acetate of Δ⁵-pregnene-3β,21-diol-20-one. | Acetate of 5α-bromo-6β-fluoro-pregnan-3β,21-diol-20-one. | 6α-fluoro-desoxy-corticosterone acetate. |
| 21-acetate of Δ⁵-pregnen-3β,17α,21-triol-11,20-dione. | 21-acetate 5α-bromo-6β-fluoro-pregnan-3β,17α,21-triol-11,20-dione. | 6α-fluoro-cortisone acetate. |
| 9α-fluoro-Δ⁵-pregnen-3β,11β,16α,17α,21-pentol-20-one. | 5α-bromo-6β,9α-difluoro-pregnan-3β,11β,16α,17α,21-pentol-20-one. | |
| 16α-methyl-Δ⁵-pregnen-3β,17α,21-triol-11,20-dione. | 5α-bromo-6β-fluoro-16α-methyl-pregnan-3β,17α,21-triol-11,21-dione. | 6α-fluoro-16α-methyl cortisone. |
| 9α-fluoro-16α-methyl-Δ⁵-pregnen-3β,17α,21-triol-11,20-dione. | 5α-bromo-6β,9α-difluoro-pregnan-3β,17α,21-triol-11,20-dione. | 6α,9α-difluoro-16α-methyl-cortisone. |
| 21-acetate of 9α-fluoro-16α-methyl-Δ⁵-pregnen-3β,11β,17α,21-tetrol-20-one. | 21-acetate of 5α-bromo-6β,9α-difluoro-16α-methyl-pregnane-3β,11β,17α,21-tetrol-20-one. | |
| 21-acetate of 16α,17α-oxido-Δ⁵-pregnen-3β,21-diol-20-one. | 21-acetate of 5α-bromo-6β-fluoro-16α,17α-oxido-3β,21-diol-20-one. | |
| 21-acetate of 16α-methyl-Δ⁵,⁹⁽¹¹⁾-pregnadien-3β,17α,21-triol-20-one. | 21-acetate of 16α-methyl-5α-bromo-6β-fluoro-Δ⁹⁽¹¹⁾-pregnen-3β,17α,21-triol-20-one. | 21-acetate of 6α-fluoro-16α-methyl-Δ⁴,⁹⁽¹¹⁾-pregnadien-17α,21-diol-3,20-dione. |
| 21-acetate of Δ⁵,⁹⁽¹¹⁾-pregnadien-3β,16α,17α,21-tetrol-20-one-16,17-acetonide. | 21-acetate of 5α-bromo-6β-fluoro-Δ⁹⁽¹¹⁾-pregnen-3β,16α,17α,21-tetrol-20-one 16,17-acetonide. | |

EXAMPLE XX

A solution of 1 g. of testosterone acetate in 25 cc. of ethyl acetate and in presence of 5 cc. of acetic acid and 2 g. of chloranil was refluxed for 6 hours. At the end of the reaction period the mixture was cooled, 25 cc. of ethyl acetate was added, the solution was washed with 5% aqueous sodium hydroxide, water, dried over anhydrous sodium sulfate and the solvent was removed by distillation under reduced pressure, leaving the acetate of Δ⁴,⁶-androstadien-17β-ol-3-one. Crystallization from acetone-hexane gave the pure compound. The above compound was then treated in accordance with Example I, dissolved in methylene dichloride, with hydrofluoric acid, N-bromoacetamide in presence of tetrahydrofurane and the resulting 6β-fluoro-7α-bromo testosterone acetate isolated by evaporating methylene-chloride and crystallization from ether-heptane.

The above compound, 1 g., dissolved in 100 cc. of ether was treated with 100 mg. of finely divided magnesium metal and 5 mg. of iodine (well mixed, preheated to 150° for 5 minutes, and then cooled in a dessicator); the mixture was stirred first for 5 minutes at room temperature, was then refluxed for additional 15 minutes, water was then added and the ethereal layer isolated, dried over anhydrous sodium sulfate and evaporated. Crystallization of the residue from acetone-hexane gave the pure acetate of 6β-fluoro-testosterone.

| Intermediate Compound | Final Compound |
| --- | --- |
| 17α-methyl-6β-fluoro-7α-bromo testosterone. | 6β-fluoro-17α-methyl-testosterone. |
| 6β-fluoro-7α-bromo estrone. | 6β-fluoro estrone. |
| Acetate of 6β-fluoro-7α-bromo estradiol. | 6β-fluoro estradiol acetate. |
| 1,2-dimethyl-6β-fluoro-7α-bromo estrone. | 1,2-dimethyl-6β-fluoro-estrone. |
| Propionate of 6β-fluoro-7α-bromo-17α-hydroxy-progesterone. | Propionate of 6β-fluoro-17α-hydroxy progesterone. |
| 21-acetate of 6β-fluoro-7α-bromo-Δ⁴-pregnen-17α,21-diol-3,20-dione. | 21-acetate of 6β-fluoro-Δ⁴-pregnen-17α,21-diol-3,20-dione. |
| 21-acetate of 6β-fluoro-7α-bromo-Δ⁴-pregnen-17α,21-diol-3,11,20-trione. | 21-acetate of 6β-fluoro-cortisone. |
| 21-propionate of 6β,9α-difluoro-7α-bromo-Δ⁴-pregnen-11,16α,17α,21-tetrol-3,20-dione 16,17-acetonide. | 21-propionate of 6β,9α-difluoro-16α-hydroxy-hydrocortisone 16,17-acetonide. |
| Acetate of 6β-fluoro-7α-bromo-Δ⁴-pregnen-21-ol-3,20-dione. | Acetate of 6β-fluoro-desoxy-corticosterone. |
| 21-acetate of 16α-methyl-9α-fluoro-4,6-pregnadien-11β,17α,21-triol-3,20-dione. | 21-acetate of 16α-methyl-6β,9α-difluoro-hydrocortisone. |
| Δ⁴,⁶,⁹⁽¹¹⁾-pregnatrien-17α,21-diol-3,20-dione. | 6β-fluoro-Δ⁴,⁹⁽¹¹⁾-pregnadien-17α,21-diol-3,20-dione. |

EXAMPLE XXIII 1 g. of the 6β-fluoro-7α-bromo-testosterone acetate, obtained in accordance with Example XX was dissolved in 25 cc. of dimethyl formamide, 500 mg. of lithium chloride was added and the mixture was refluxed 8 hours under nitrogen atmosphere. At the end of the reaction period the mixture was filtered, the filtrate was evaporated under reduced pressure and the residue was crystallized from acetone-hexane to give pure 6-fluoro-Δ⁶-dehydro testosterone acetate.

EXAMPLE XXIV

By the same method as described above but substituting lithium chloride by calcium carbonate, and refluxing only 2 hours, there was produced the acetate of 6-fluoro-Δ⁶-dehydro testosterone in essentially the same yield.

EXAMPLE XXV 1 g. of the 6β-fluoro-7α-bromo-testosterone acetate, was dissolved in 25 cc. of acetic acid, 1 cc. of concentrated hydrochloric acid was added, and the mixture was refluxed 24 hours. The solution was then cooled, diluted with water, the precipitate was collected, washed, dried and crystallized from ethyl acetate-ether. The compound thus formed was found to be identical with 6-fluoro-Δ⁶-dehydro-testosterone acetate, produced as described in Example XXIII.

EXAMPLE XXVI 1 g. of the 6β-fluoro-7α-bromo-testosterone acetate, dissolved in 40 cc. of acetic acid, was treated, while stirring and at room temperature, with an aqueous solution of chromous chloride (3 mols); the solution was stirred for 30 minutes, was poured into water and the precipitate was collected, washed and dried. The compound thus formed was found to be identical with 6β-fluoro testosterone acetate.

EXAMPLE XXVII

By the same method as described above, but substituting 6β-fluoro-7α-bromo-testosterone acetate by 6β-fluoro-7α-bromo progesterone and acetic acid by acetone, there was produced 6β-fluoro progesterone.

EXAMPLE XXVIII

By the same method as described in Example XX and XXIV there were prepared theΔ⁶-dehydro, thte 6β-fluoro-7α-bromo and the 6-fluoro compounds respectively as indicated in Table V.

EXAMPLE XXX

By the same method as described in Example XXIII and using the intermediate compounds made in accordance with Example XXI there were prepared 6-fluoro-Δ⁶-dehydro-estrone, 6-fluoro-Δ⁶-dehydro estradiol and 1,2-dimethyl-6-fluoro-Δ⁶-dehydro estrone.

EXAMPLE XXXI

By the same method as described in Example X but substituting Δ⁵-pregnen-3β-ol-20-one by Δ⁴-pregnen-3β-ol-20-one there was obtained 4β-fluoro-5α-bromo pregnan-3β-ol-20-one, 4β-fluoro-5α-bromo-pregnan-3,20-dione and finally 4-fluoro-progesterone.

In the same manner there was obtained, starting from 17α-ethinyl-Δ⁴-androsten-3β, 17β-diol and 17α-ethinyl-Δ⁴-19-nor-androsten-3β,17β-diol, 4-fluoro-17α-ethinyl testosterone and 4-fluoro-17α-ethinyl-17-nortestosterone respectively.

I claim:
1. A compound of the formula:

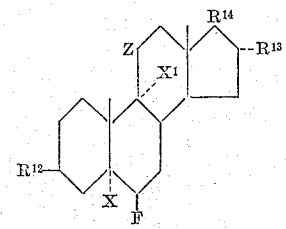

wherein X is selected from the group consisting of chlorine, bromine and iodine, $X^1$ is selected from the group consisting of hydrogen, fluorine, chlorine and bromine, Z is selected from the group consisting of hydrogen, =O and $$\diagup^{OH}_{H}$$

$R^{12}$ is selected from the group consisting of hydroxyl, keto and ethylenedioxy, $R^{13}$ is selected from the group

Table V

| Starting Material | Intermediate Compound | Final Compound |
|---|---|---|
| Testosterone undecenoate | 6β-fluoro-7α-bromotestosterone undecenoate. | 6-fluoro-Δ⁶-dehyrdotestosterone undecenoate. |
| 17α-ethyl-testosterone | 6β-fluoro-7α-bromo-17-ethyl-testosterone | 6-fluoro-Δ⁶-dehydro-17α-ethyl-testosterone. |
| 9α-fluoro-11β-hydroxy-17α methyl-testosterone. | 6β, 9α-difluoro-7α-bromo-11β-hydroxy-17α-methyl-testosterone. | 6, 9α-difluoro-11β-hydroxy-17α-methyl-Δ⁶-dehydro-testosterone. |
| Cyclopentyl propionate of 17α-methyl-testosterone. | Cyclopentylpropionate of 6β-fluoro-7α-bromo-17α-methyl-testosterone. | Cyclopentylpropionate of 6-fluoro-Δ⁶-dehydro-17α-methyl-testosterone. |
| Progesterone | 6β-fluoro-7α-bromo-progesterone | 6-fluoro-Δ⁶-dehydro-progesterone. |
| 17α-acetoxy-progesterone | 6β-fluoro-7α-bromo-17α-acetoxy progesterone. | 6-fluoro-Δ⁶-dehydro-17α-acetoxy progesterone. |
| Δ⁴-pregnen-17α, 21-diol-3,20-dione | 6β-fluoro-7α-bromo-Δ⁴-pregnen-17α,21-diol-3,20-dione. | 6-fluoro-Δ⁴,⁶-pregnadien-17α,21-diol-3,20-dione. |
| 21-acetate of Δ⁴-pregnen-17α,21-diol-3,11,20-trione. | 21-acetate of 6β-fluoro-7α-bromo-Δ⁴-pregnen-17α,21-diol-3,11,20-trione. | 21-acetate of 6-fluoro-Δ⁴,⁶-pregnadien-17α,21-diol-3,11,20-trione. |
| 21-acetate of 9α-fluoro-Δ⁴-pregnen-11β, 17α, 21-triol-3,20-dione. | 21-acetate of 6β, 9α-difluoro-7α-bromo-Δ⁴-pregnen-11β, 17α, 21-triol-3,20-dione. | 21-acetate of 6, 9α-difluoro-Δ⁴,⁶-pregnadien-11β, 17α, 21-triol-3,20-dione. |
| 9α-fluoro-16α-methyl-hydrocortisone | 6β, 9α-difluoro-7α-bromo-16α-methyl-hydrocortisone. | 6, 9α-difluoro-16α-methyl-Δ⁴,⁶-pregnadien-11β, 17α, 21-triol-3,20-dione. |
| 21-acetate of Δ⁴,⁹(¹¹)-pregnatrien-17α, 21-diol-3,20-dione. | 21-acetate of 6β-fluoro-7α-bromo-Δ⁴,⁹(¹¹)-pregnadien-17α, 21-diol-3,20-dione. | 21-acetate of 6-fluoro-Δ⁴,⁶,⁹(¹¹)-pregnatrien-17α, 21-diol-3,20-dione. |

EXAMPLE XXIX

By the same method as described in Example XXIII there were prepared, starting from the fluoro-halo compounds made in accordance with the method described in Example XIII, the corresponding 2-fluoro-Δ¹-dehydro-, 15-fluoro-Δ¹⁴-dehydro-, and 16-fluoro-Δ¹⁶-dehydro derivatives. More specifically, there were prepared 2-fluoro-17α-acetoxy-Δ¹-dehydro progresterone, 2-fluoro-prednisone, the 21-acetate of 2,9α-difluoro-prednisolone, 21-acetate of 15-fluoro - Δ⁴,¹⁴ - pregnadien-17α,21-diol-3,20-dione, 16-fluoro - Δ⁴,¹⁶ - pregnadien - 3,20 - dione and the acetate of 16-fluoro-Δ¹⁶-allopregnen-3β-ol-11,30-dione.

consisting of hydrogen, hydroxyl and methyl, and $R^{14}$ is selected from the group consisting of =O, $$\diagup^{OR^{15}}_{R^{15}}, \diagup^{CO-CH_3}_{H}, \diagup^{CO-CH_3}_{OR^{15}}, \diagup^{CO-CH_2OR^{15}}_{H}$$

and $$\diagup^{CO-CH_2OR^{15}}_{OR^{15}}$$

and $R^{15}$ is selected from the group consisting of hydrogen and a hydrocarbon carboxylic acyl group of up to 12 carbon atoms, and $R^{16}$ is selected from the group consisting of hydrogen, lower alkyl, lower alkenyl, and lower alkinyl.

2. 5α - bromo-6β-fluoro-17α-methyl-androstan-3β,17β-diol.

3. The hydrocarbon carboxylic acid esters of up to 12 carbon atoms of 5α-bromo-6β-fluoro-17α-methyl-androstane-3β,17β-diol.

4. 5α-bromo-6β-fluoro-pregnan-3β-ol-20-one.

5. 5α-bromo-6β-fluoro-pregnan-3β,17α-diol-20-one.

6. 5α-bromo-6β-fluoro-pregnan-17α-ol-3,20-dione.

7. The hydrocarbon carboxylic acid esters of up to 12 carbon atoms of 5α-bromo-6β-fluoro-pregnan-17α-ol-3,20-dione.

8. 5α - bromo-6β-fluoro-pregnan-3β,17α,21-triol-20-one.

9. 5α - bromo-6β-fluoro-pregnan-17α,21-diol-3,20-dione.

10. 5α - bromo-6β-fluoro-Δ$^{9(11)}$-pregnen-3β,16α,17α,21-tetrol-20-one 16,17-acetonide.

11. 5α - bromo-6β,9α-difluoro-pregnan-3β,11β,17α,21-tetrol-20-one.

12. 5α - bromo-6β-fluoro-16α-methyl-pregnan-3β,17α,21-triol-11,20-dione.

13. The hydrocarbon carboxylic acid esters of up to 12 carbon atoms of 5α-bromo-6β-fluoro-16α-methyl-pregnan-3β,17α,21-triol-11, 20-dione.

14. 5α - bromo - 6β - fluoro - 16α-methyl-pregnan-16β 17α,21-triol-3,20-dione.

15. 5α - bromo-6β,9α-difluoro-16α-methyl-pregnan-3β,11β,17α,21-tetrol-20-one.

16. 5α - bromo - 6β,9α - difluoro-pregnan-3β,11β,16α,17α,21-pentol-20-one.

17. A process for the fluorination of the double bond between carbon five and six of cyclopentanophenanthrene compounds selected from the class consisting of compounds of the pregnene and androstene series comprising reacting the compound, in the presence of a hydrogen acceptor selected from the group consisting of hydrocarbon ethers and ketones, with hydrofluoric acid and an N-chloro hydrocarbon amide to produce the corresponding 5α - chloro-6β-fluoro-cyclopentanophenanthrene compound, there being present in the reaction mixture for each mol of cyclopentanophenanthrene compound, 1 to 100 mols of hydrofluoric acid, 0.1 to 2 mols of hydrogen acceptor, and 0.5 to 1.5 molar equivalents of N-chloro hydrocarbon amide, and the temperature of the reaction mixture is maintained during the reaction below 0° C.

18. A process for the fluorination of the double bond between carbon five and six of cyclopentanophenanthrene compounds selected from the class consisting of compounds of the pregnene and androstene series comprising reacting the compound, in the presence of a hydrogen acceptor selected from the group consisting of hydrocarbon ethers and ketones, with hydrofluoric acid and an N-chloro hydrocarbon imide to produce the corresponding 5α-chloro-6β-fluoro-cyclopentanophenanthrene compound, there being present in the reaction mixture for each mol of cyclopentanophenanthrene compound, 1 to 100 mols of hydrofluoric acid, 0.1 to 2 mols of hydrogen acceptor, and 0.5 to 1.5 molar equivalents of N-chloro hydrocarbon imide, and the temperature of the reaction mixture is maintained during the reaction below 0° C.

19. A process for the fluorination of the double bond between carbon five and six of cyclopentanophenanthrene compounds selected from the class consisting of compounds of the pregnene and androstene series comprising reacting the compound, in the presence of a hydrogen acceptor selected from the group consisting of hydrocarbon ethers and ketones, with hydrofluoric acid and an N-bromo hydrocarbon amide to produce the corresponding 5α-bromo-6β-fluoro-cyclopentanophenanthrene compound, there being present in the reaction mixture for each mol of cyclopentanophenanthrene compound, 1 to 100 mols of hydrofluoric acid, 0.1 to 2 mols of hydrogen acceptor, and 0.5 to 1.5 molar equivalents of N-bromo hydrocarbon amide, and the temperature of the reaction mixture is maintained during the reaction below 0° C.

20. A process for the fluorination of the double bond between carbon five and six of cyclopentanophenanthrene compounds selected from the class consisting of compounds of the pregnene and androstene series comprising reacting the compound, in the presence of a hydrogen acceptor selected from the group consisting of hydrocarbon ethers and ketones, with hydrofluoric acid and an N-bromo hydrocarbon imide to produce the corresponding 5α-bromo-6β-fluoro-cyclopentanophenanthrene compound, there being present in the reaction mixture for each mol of cyclopentanophenanthrene compound, 1 to 100 mols of hydrofluoric acid, 0.1 to 2 mols of hydrogen acceptor, and 0.5 to 1.5 molar equivalents of N-bromo hydrocarbon imide, and the temperature of the reaction mixture is maintained during the reaction below 0° C.

References Cited in the file of this patent
UNITED STATES PATENTS

| | | |
|---|---|---|
| 2,673,884 | Thomas | Mar. 30, 1954 |
| 2,884,417 | Cutler et al. | Apr. 28, 1959 |

UNITED STATES PATENT OFFICE
CERTIFICATE OF CORRECTION

Patent No. 3,173,914                          March 16, 1965

Albert Bowers

It is hereby certified that error appears in the above numbered patent requiring correction and that the said Letters Patent should read as corrected below.

In the heading to the printed specification, lines 2 and 3, for "5,6-DIFLUORO STEROIDS AND PROCESS FOR THE PREPARATION THEREOF" read -- 5-HALO-6-FLUORO STEROIDS AND PROCESS FOR THE PREPARATION THEREOF --.

Signed and sealed this 14th day of September 1965.

(SEAL)
Attest:

ERNEST W. SWIDER
Attesting Officer

EDWARD J. BRENNER
                                                  Commissioner of Patents